United States Patent
Ham

(10) Patent No.: US 9,660,835 B2
(45) Date of Patent: May 23, 2017

(54) BIDIRECTIONAL PACKET TRANSFER FAIL-OVER SWITCH FOR SERIAL COMMUNICATION

(71) Applicant: LSIS CO., LTD., Anyang-si, Gyeonggi-do (KR)

(72) Inventor: Sung Sik Ham, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 219 days.

(21) Appl. No.: 14/540,901

(22) Filed: Nov. 13, 2014

(65) Prior Publication Data

US 2015/0156060 A1  Jun. 4, 2015

(30) Foreign Application Priority Data

Nov. 29, 2013 (KR) ........................ 10-2013-0147456

(51) Int. Cl.
*H04L 12/28* (2006.01)
*H04L 12/64* (2006.01)
*H04L 12/865* (2013.01)
*H04L 12/935* (2013.01)
*H04L 12/933* (2013.01)

(52) U.S. Cl.
CPC ...... *H04L 12/6418* (2013.01); *H04L 47/6275* (2013.01); *H04L 49/103* (2013.01); *H04L 49/3036* (2013.01)

(58) Field of Classification Search
CPC .......................... H04L 12/6418; H04L 49/103
USPC ........................................................ 370/219
See application file for complete search history.

(56) References Cited

U.S. PATENT DOCUMENTS

| | | | | |
|---|---|---|---|---|
| 7,277,429 | B2 * | 10/2007 | Norman | H04L 49/15 370/386 |
| 2003/0051081 | A1 * | 3/2003 | Maeda | G06F 3/0613 710/20 |
| 2013/0083611 | A1 * | 4/2013 | Ware | G06F 1/3275 365/191 |

FOREIGN PATENT DOCUMENTS

JP  2000-174790  6/2000

OTHER PUBLICATIONS

Korean Intellectual Property Office Application Serial No. 10-2013-0147456, Office Action dated Sep. 29, 2014, 3 pages.

\* cited by examiner

*Primary Examiner* — Wei Zhao
(74) *Attorney, Agent, or Firm* — Lee, Hong, Degerman, Kang & Waimey PC

(57) ABSTRACT

Disclosed is a bidirectional packet transfer fail-over switch for serial communication. The bidirectional packet transfer fail-over switch for serial communication includes a memory configured to divide packet data, which is transmitted or received for bidirectional communication between a plurality of communication devices, in units of certain data, and store the divided data, and a control unit configured to receive a trigger signal, indicating whether the packet data is received, from the memory, determine a priority according to an order where the packet data is received, and transmit the packet data to another communication device.

8 Claims, 5 Drawing Sheets

BIDIRECTIONAL PACKET TRANSFER FAIL-OVER SWITCH FOR SERIAL COMMUNICATION

CROSS-REFERENCE TO RELATED APPLICATION

Pursuant to 35 U.S.C. §119(a), this application claims the benefit of earlier filing date and right of priority to Korean Application No. 10-2013-0147456, filed on Nov. 29, 2013, the contents of which are all hereby incorporated by reference herein in its entirety.

BACKGROUND OF THE DISCLOSURE

1. Field of the Disclosure

The present disclosure relates to a bidirectional packet transfer fail-over switch for serial communication, and particularly, to a bidirectional packet transfer fail-over switch for serial communication, which multiplexes a single communication line into a plurality of communication lines in a serial communication network depending on the high-speed transfer of a communication packet and introduction of a bidirectional communication scheme, and transfers and processes bidirectional communication packets which are simultaneously generated.

2. Background of the Disclosure

A communication terminal apparatus of an industrial real-time monitoring and control system is operated in a communication node dualization scheme and a network line dualization scheme, for considering a reliability of a system.

However, in a main unit system, when a distance between communication terminal apparatuses is a long distance of several km or more, the double establishment of a network line causes an increase in the line establishment cost and the operating cost.

Therefore, it is required to establish a single communication line between a main apparatus and a communication terminal apparatus. In the communication terminal apparatus, it is required to operate an efficient dualization system by providing a communication network multiplexing function to a system which is provided as a dualization system.

A serial fail-over switch distributes a communication packet, which is received through a single communication line, to a plurality of network nodes. A system is mostly operated as a unidirectional communication system in which a system main apparatus, a master, is an initial command requester.

A related art fail-over switch for serial communication is implemented to be suitable for a function of transferring a unidirectional communication packet generated from a node in which a master is uniquely defined.

Therefore, signals which are simultaneously generated from two or more nodes are not normally transferred. For example, there is a limitation in characteristic of an operation of transferring packets which are generated from two or more of three nodes at the same time.

A 1:1 communication line between nodes should be established and operated in order for a bidirectional packet to be transferred like a system having a multi-master or an inter-node 1:1 full duplex scheme. However, in long-distance communication, the establishment cost and the operating cost should be expended by two or more times for establishing a plurality of 1:1 communication lines.

In most of monitoring and control systems, a first node is used as a main apparatus node, and a second node and a third node are used as dualization main/auxiliary nodes of a communication terminal apparatus. When there is no response packet in the main node or an error occurs in the main node, the auxiliary node automatically acquires an operation authority, and executes an authority of the main node.

However, the frequent occurrence of collision between communication packets causes a problem in which a normal operation of an operation authority algorithm of the main/auxiliary node is not ensured, causing a reduction in stability of a system.

Recently, as propagation of Ethernet communication is expanded and the requirement for popularization of a medium and a connection with another network increases, communication packet switch equipment is widely propagated and spread in a system terminal apparatus. Also, as the high-speed transfer of a communication packet and introduction of a bidirectional communication scheme are expanded, it is required to introduce a system using a bidirectional switch function even in a serial communication network.

SUMMARY OF THE DISCLOSURE

Therefore, an aspect of the detailed description is to provide a bidirectional packet transfer fail-over switch for serial communication, which multiplexes a single communication line into a plurality of communication lines in a serial communication network depending on the high-speed transfer of a communication packet and introduction of a bidirectional communication scheme, and transfers and processes bidirectional communication packets which are simultaneously generated.

In addition to the aforesaid objects of the present invention, other features and advantages of the present invention will be described below, but will be clearly understood by those skilled in the art from descriptions below.

To achieve these and other advantages and in accordance with the purpose of this specification, as embodied and broadly described herein, a bidirectional packet transfer fail-over switch for serial communication includes: a memory configured to divide packet data, which is transmitted or received for bidirectional communication between a plurality of communication devices, in units of certain data, and store the divided data; and a control unit configured to receive a trigger signal, indicating whether the packet data is received, from the memory, determine a priority according to an order where the packet data is received, and transmit the packet data to another communication device.

The memory may include a first dual FIFO memory configured to store packet data received from a first communication device, a first FIFO memory configured to store packet data received from a second communication device, and a second FIFO memory configured to store packet data received from a third communication device, and the control unit may include a first transmission control unit configured to read data from the first dual FIFO memory and the second FIFO memory to output the data to the second communication device according to priority, and a second transmission control unit configured to read data from the first dual FIFO memory and the first FIFO memory to output the data to the third communication device according to priority.

The memory may further include a second dual FIFO memory configured to store packet data which is to be output to the first communication device, and the control unit may include a first reception control unit configured to store packet data, received from the second communication device, in the first FIFO memory and the second dual FIFO memory, and a second reception control unit configured to store packet data, received from the third communication device, in the second FIFO memory and the second dual FIFO memory.

The first dual FIFO memory may transfer a packet data presence signal as a trigger signal to the first transmission control unit and the second transmission control unit.

In transmitting a packet, when the first transmission control unit and the second transmission control unit receive a packet presence trigger signal from the first FIFO memory and the second FIFO memory, after a communication packet of the first dual FIFO memory is transmitted, the first transmission control unit and the second transmission control unit may transmit a communication packet of each of the first FIFO memory and the second FIFO memory to the second communication device or the third communication device.

A packet size and a character size of a single packet, required by the first dual FIFO memory, the second dual FIFO memory, the first FIFO memory, and the second FIFO memory, may be variably adjusted.

The first transmission control unit and the second transmission control unit may include a built-in priority determination algorithm which is designed to preferentially transfer a packet which is first received from each of the first FIFO memory and the second FIFO memory in time.

The bidirectional packet transfer fail-over switch may further include: a first serial driver configured to convert a communication media signal level into a Transistor-Transistor Logic (TTL) level signal, for packet data received from a plurality of the communication devices; and a second serial driver configured to convert a TTL level signal into a communication media signal level, for packet data which is to be transmitted to the plurality of communication devices.

The bidirectional packet transfer fail-over switch may further include a plurality of input/output terminals for a full-duplex communication transmission/reception structure in which TX or RX is separately provided to a plurality of the communication devices.

The control unit may be implemented with a programmable logic controller IC, and may be designed so that real-time transfer of a communication packet and an idle time between packets are automatically varied at a communication baud rate.

According to embodiments of the present invention, a long-distance single communication device based on serial communication is multiplexed into two communication devices of a terminal apparatus, and a packet is transferred, whereby a single network is doubly extended. Therefore, when a communication device for a specific terminal apparatus among communication devices for two terminal apparatuses performs an abnormal operation, another communication device automatically performs a backup operation.

Moreover, a bidirectional packet is simultaneously transmitted, and thus, a reliable communication backup function is performed between two communication devices of a terminal apparatus.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Embodiments will be described in detail below with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art. The terms used in this specification were selected to include current, widely-used, general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

In the following description, and the word 'including' does not preclude the presence of other components or steps as listed.

Figure 1:
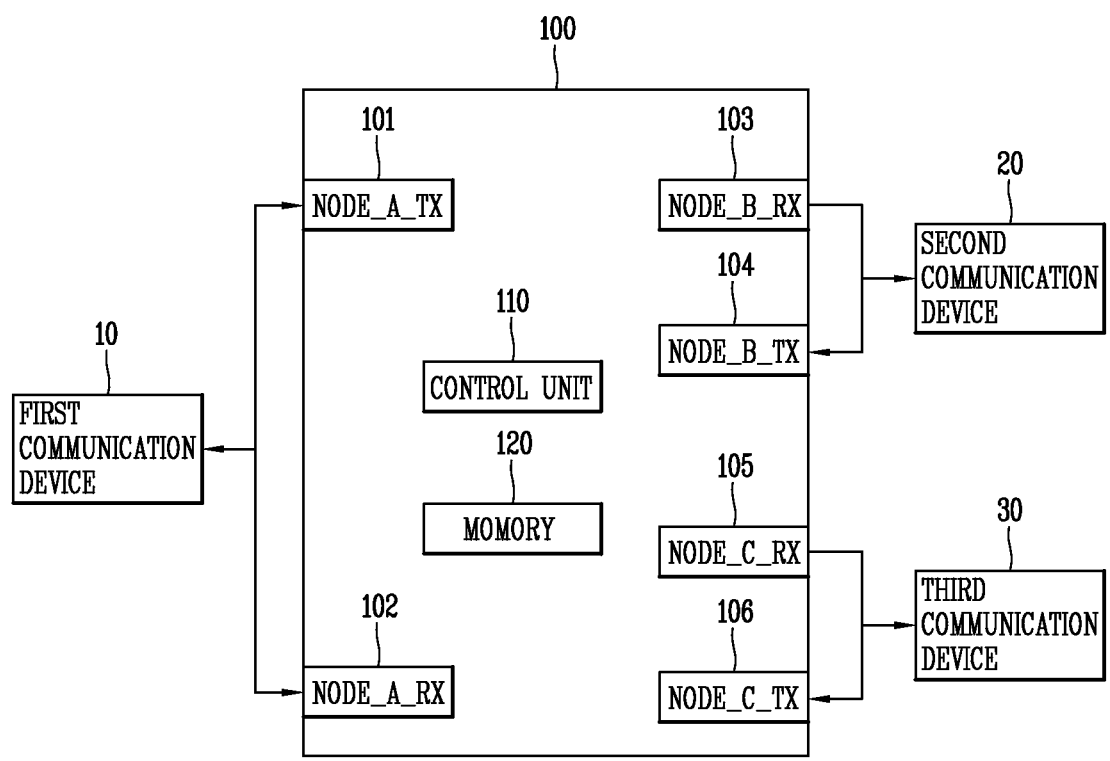
FIG. 1 is a diagram for describing a bidirectional packet transfer fail-over switch for serial communication according to an embodiment of the present invention.

FIG. 1 is a diagram for describing a bidirectional packet transfer fail-over switch 100 for serial communication according to an embodiment of the present invention.

Referring to FIG. 1, the bidirectional packet transfer fail-over switch 100 for serial communication according to an embodiment of the present invention connects three communication nodes 10, 20 and 30. A first communication device 10, a second communication device 20, and a third communication device 30 have a full-duplex communication transmission/reception structure in which TX/RX is separately provided.

The bidirectional packet transfer fail-over switch 100 may transfer a packet, which is transmitted or received to or from a first communication node 10, to a second communication node 20 and a third communication node 30.

The bidirectional packet transfer fail-over switch 100 may include a control unit 110 and a memory 120.

The bidirectional packet transfer fail-over switch 100 may transfer transmission data of the first communication node 10 to the second communication node 20 through a NODE_A_TX terminal 101 and a NODE_B_RX terminal 103.

The bidirectional packet transfer fail-over switch 100 may transfer the transmission data of the first communication node 10 to the third communication node 30 through the NODE_A_TX terminal 101 and a NODE_C_RX terminal 105.

The bidirectional packet transfer fail-over switch 100 may transfer transmission data of the second communication node 20 to the first communication node 10 through a NODE_B_TX terminal 104 and a NODE_A_RX terminal 102.

The bidirectional packet transfer fail-over switch 100 may transfer transmission data of the third communication node 30 to the first communication node 10 through a NODE_C_TX terminal 106 and the NODE_A_RX terminal 102.

The control unit 110 may store data, which is transmitted or received between the first communication node 10, the second communication node 20, and the third communication node 30, in the memory 120.

The control unit 110 may transmit data in the order where the data, which is transmitted or received between the first communication node 10, the second communication node 20, and the third communication node 30, is transferred, based on the data stored in the memory 120. Therefore, bidirectional communication is performed without packet collision which occurs in transmitting or receiving data.

Figure 2:
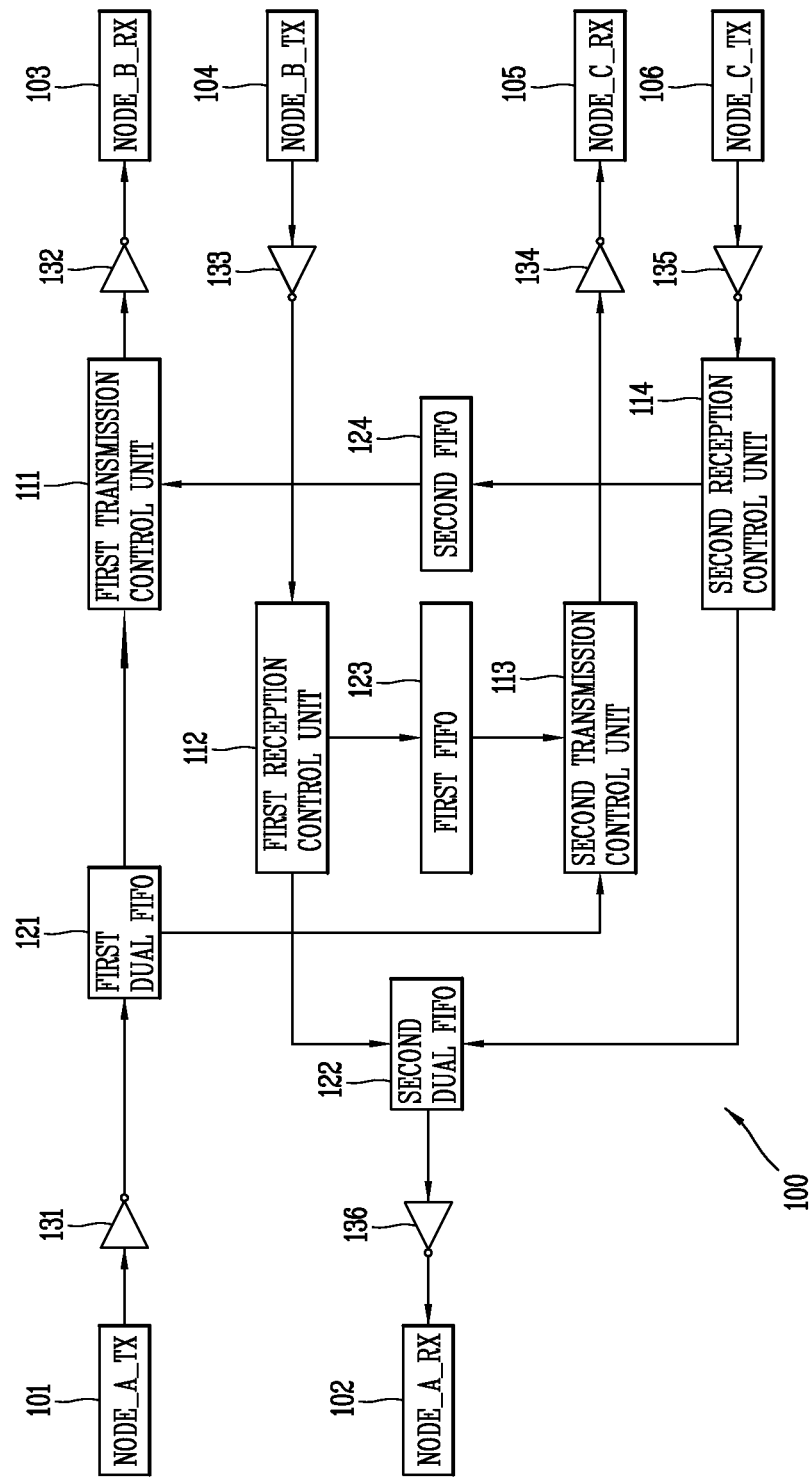
FIG. 2 is a block diagram of the bidirectional packet transfer fail-over switch for serial communication according to an embodiment of the present invention.

FIG. 2 is a block diagram of the bidirectional packet transfer fail-over switch for serial communication according to an embodiment of the present invention.

Referring to FIG. 2, the bidirectional packet transfer fail-over switch 100 for serial communication according to an embodiment of the present invention may include a first transmission control unit 111, a first reception control unit 112, a second transmission control unit 113, and a second reception control unit 114.

The control unit 110 may be implemented with a programmable logic controller IC such as a field-programmable gate array or a complex programmable logic device (CPLD). Therefore, the control unit 110 may be implemented with a logic schematic and a logic language, and may be designed so that the real-time transfer of a communication packet and an idle time between packets are automatically varied at a communication baud rate.

The bidirectional packet transfer fail-over switch 100 may include the memory 120 which includes a first dual first-in, first-out (FIFO) memory 121, a second dual FIFO memory 122, a first FIFO memory 123, and a second FIFO memory 124.

The bidirectional packet transfer fail-over switch 100 may include a first serial driver 131, a second serial driver 132, a third serial driver 133, a fourth serial driver 134, a fifth serial driver 135, and a sixth serial driver 136.

The first transmission control unit 111 may be a FIFO controller which determines a packet, which is to be transmitted, in the first dual FIFO memory 121 and the second FIFO memory 124, and transfers the packet to the second communication device 20 in a time order.

The second transmission control unit 113 may be a FIFO controller which determines a packet, which is to be transmitted, in the first dual FIFO memory 121 and the first FIFO memory 123, and transfers the packet to the third communication device 30 in a time order.

The first reception control unit 112 may be a FIFO controller which transfers a packet, which is received from the second communication device 20, to the first FIFO memory 123 and the second dual FIFO memory 122.

The second reception control unit 114 may be a FIFO controller which transfers a packet, which is received from the third communication device 30, to the second FIFO memory 124 and the second dual FIFO memory 122.

Each of the first dual FIFO memory 121 and the second dual FIFO memory 122 may be a FIFO memory which has a dual port input/output structure.

Each of the first dual FIFO memory 121 and the second dual FIFO memory 122 may be equipped with two FIFO memories which are built therein, and may operate in order for a packet to be processed in a FIFO scheme.

Each of the first FIFO memory 123 and the second FIFO memory 124 may be a single port input/output FIFO memory. The first FIFO memory 123 may store a packet received from the first reception control unit 112, and transfer the presence of storage of the packet to the second transmission control unit 113.

The second FIFO memory 124 may store a packet received from the second reception control unit 114, and transfer the presence of storage of the packet to the first transmission control unit 111.

The first serial driver 131, the third serial driver 133, and the fifth serial driver 155 may convert a communication media (for example, RS323 or RS485) signal level into a TTL level signal.

The second serial driver 132, the fourth serial driver 134, and the sixth serial driver 136 may convert a TTL level signal into a media level signal.

The first reception control unit 112 and the second reception control unit 114 may divide a TTL bit stream data into 8-bit (1 octet) data, and store the 8-bit data in the first FIFO memory 123 and the second FIFO memory 124.

Therefore, when a 1.5-character (8-bit) idle state at a communication baud rate is automatically maintained, it may be determined that transmission is ended, and all TTL level signals input or output from the second communication device 20 and the third communication device 30 may be stored in units of a packet in the first FIFO memory 123 and the second FIFO memory 124.

The first transmission control unit 111 and the second transmission control unit 113 may receive a trigger signal, indicating whether a packet is received, from the first FIFO memory 123 and the second FIFO memory 124 to determine a priority, and transmit a communication packet to the second communication node 20 and the third communication node 30.

Figure 3:
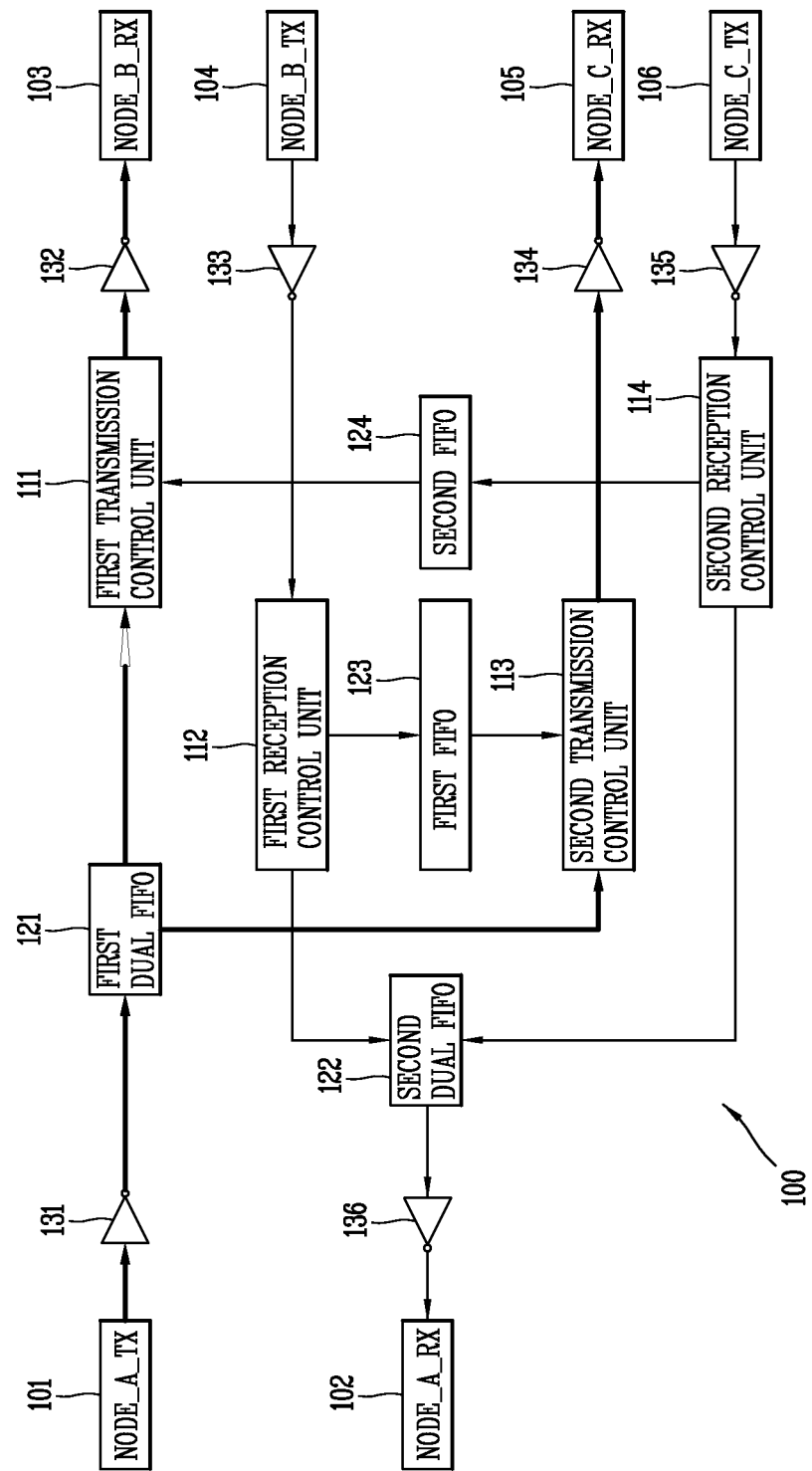
FIG. 3 is a block diagram illustrating a path through transmission data of a first communication device is transferred, in the bidirectional packet transfer fail-over switch for serial communication according to an embodiment of the present invention.

FIG. 3 is a block diagram illustrating a path through transmission data of a first communication device is transferred, in the bidirectional packet transfer fail-over switch for serial communication according to an embodiment of the present invention.

Referring to FIG. 3, in the bidirectional packet transfer fail-over switch 100, transmission data of the first communication node 10 may be input to the first serial driver 131 through the NODE_A_TX terminal 101.

The first serial driver 131 may convert a communication media (for example, RS323 or RS485) signal level into a TTL level signal, and store the TTL level signal in the first dual FIFO memory 121. The first transmission control unit 111 may read data from the first dual FIFO memory 121, and output the data to the second serial driver 132. The second serial driver 132 may convert a TTL level signal into a communication media signal level, and transfer the communication media signal level to the second communication node 20 through the NODE_B_RX terminal 103.

The second transmission control unit 113 may read data from the first dual FIFO memory 121, and output the data to the fourth serial driver 134. The fourth serial driver 134 may convert a TTL level signal into a communication media signal level, and transfer the communication media signal level to the third communication node 30 through the NODE_C_RX terminal 105.

Transmission data of the first communication device 10 may be input through the NODE_A_TX terminal 101, converted into a TTL level by the first serial driver 131, and stored in the first dual FIFO memory 121.

The first dual FIFO memory 121 may transfer a packet presence signal as a trigger signal to the first transmission control unit 111 and the second transmission control unit 113.

The first transmission control unit 111 and the second transmission control unit 113 may receive the trigger signal, and may immediately transmit a communication packet to the NODE_B_RX terminal 103 or the NODE_C_RX terminal 105 through the second serial driver 132 and the fourth serial driver 134.

In transmitting a packet, when the first transmission control unit 111 and the second transmission control unit 113 receive a packet presence trigger signal from the first FIFO memory 123 and the second FIFO memory 124, after a communication packet of the first dual FIFO memory 121 is transmitted (after a 1.5 character idle time), the first transmission control unit 111 and the second transmission control unit 113 may transmit a communication packet of each of the first FIFO memory 123 and the second FIFO memory 124 to the NODE_B_RX terminal 103 or the NODE_C_RX terminal 105.

A packet size and a character size of a single packet, required by the first dual FIFO memory 121, the second dual FIFO memory 122, the first FIFO memory 123, and the second FIFO memory 124, may be variably adjusted.

The first transmission control unit 111 and the second transmission control unit 113 may include a built-in priority determination algorithm which is designed to preferentially transfer a packet which is first received from each of the first FIFO memory 123 and the second FIFO memory 124 in time.

The first FIFO memory 123 and the second FIFO memory 124 may be used for the purpose of storing data and for the purpose of storing a plurality of packets in the middle of transferring a prior packet.

Figure 4:
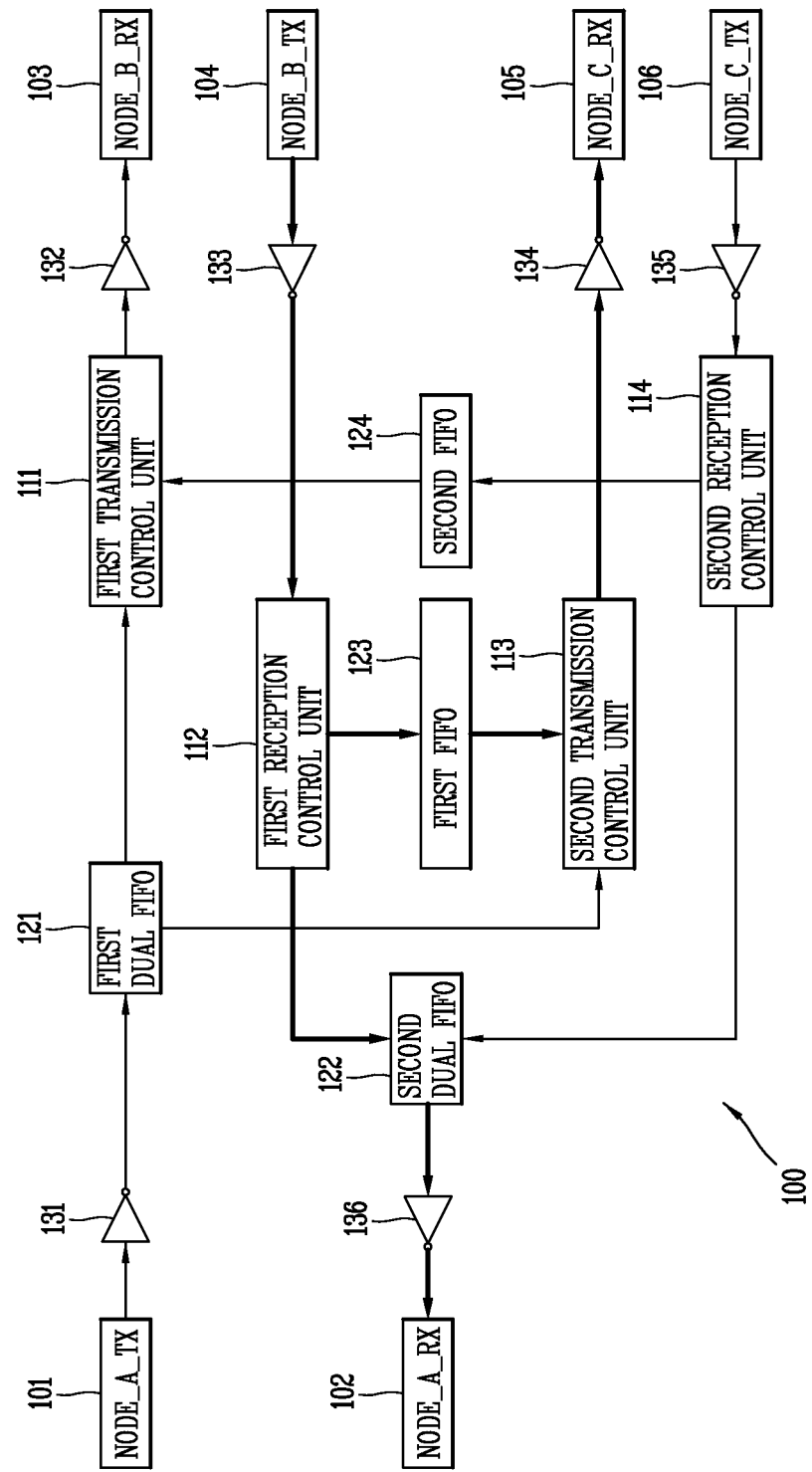
FIG. 4 is a block diagram illustrating a path through transmission data of a second communication device is transferred, in the bidirectional packet transfer fail-over switch for serial communication according to an embodiment of the present invention.

FIG. 4 is a block diagram illustrating a path through transmission data of a second communication device is transferred, in the bidirectional packet transfer fail-over switch for serial communication according to an embodiment of the present invention.

Referring to FIG. 4, in the bidirectional packet transfer fail-over switch 100, transmission data of the second communication node 20 may be input to the third serial driver 133 through the NODE_B_TX terminal 104.

The third serial driver 133 may convert a communication media (for example, RS323 or RS485) signal level into a TTL level signal, and transfer the TTL level signal to the first reception control unit 112. The first reception control unit 112 may store input data in the second dual FIFO memory 122 and the first FIFO memory 123. The second transmission control unit 113 may read data from the first FIFO memory 123, and output the data to the fourth serial driver 134. The fourth serial driver 134 may convert a TTL level signal into a communication media signal level, and transfer the communication media signal level to the third communication node 30 through the NODE_C_RX terminal 105.

The second dual FIFO memory 122 may output input data to the sixth serial driver 136. The sixth serial driver 136 may convert a TTL level signal into a communication media signal level, and transfer the communication media signal level to the first communication node 10 through the NODE_A_RX terminal 102.

Transmission data from the second communication device 20 may be input through the NODE_B_TX terminal 104, converted into a TTL level by the third serial driver 133, and stored in the first FIFO memory 123 and the second dual FIFO memory 122 by the first reception control unit 112.

The second dual FIFO memory 122 may preferentially transfer a packet, which is first received and stored in time by applying a FIFO scheme among packets received from a dual port, to the NODE_A_RX terminal 102.

By transferring a communication packet transfer trigger signal to the second transmission control unit 113, a packet stored in the first FIFO memory 123 may be transmitted to the NODE_C_RX terminal 105 by a priority algorithm of the second transmission control unit 113.

Figure 5:
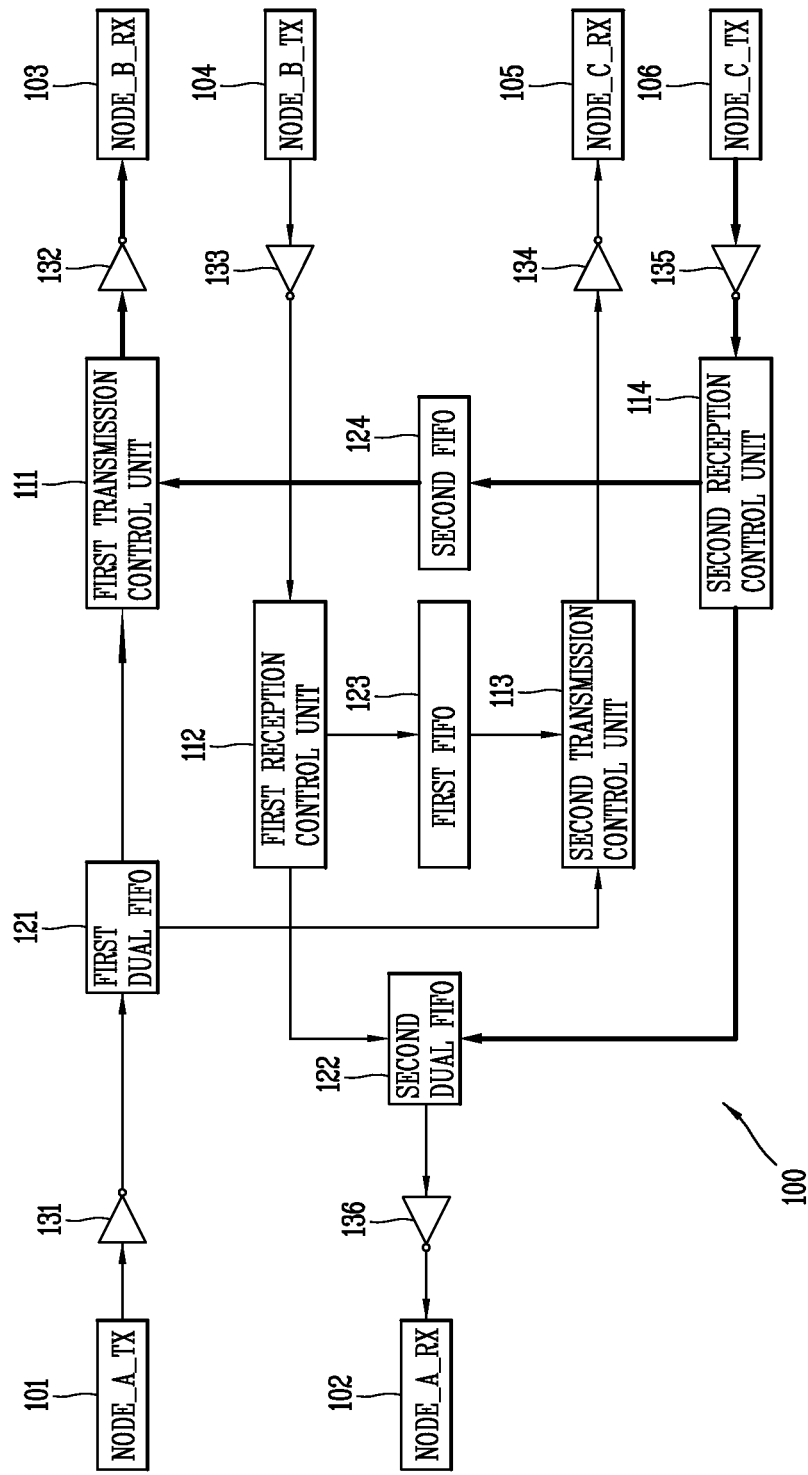
FIG. 5 is a block diagram illustrating a path through transmission data of a third communication device is transferred, in the bidirectional packet transfer fail-over switch for serial communication according to an embodiment of the present invention.

FIG. 5 is a block diagram illustrating a path through transmission data of a third communication device is transferred, in the bidirectional packet transfer fail-over switch for serial communication according to an embodiment of the present invention.

Referring to FIG. 5, in the bidirectional packet transfer fail-over switch 100, transmission data of the third communication node 30 may be input to the fifth serial driver 135 through the NODE_C_TX terminal 106.

The fifth serial driver 135 may convert a communication media (for example, RS323 or RS485) signal level into a TTL level signal, and transfer the TTL level signal to the second reception control unit 114. The second reception control unit 114 may store input data in the second dual FIFO memory 122 and the second FIFO memory 124. The first transmission control unit 111 may read data from the second FIFO memory 124, and output the data to the second serial driver 132. The second serial driver 132 may convert a TTL level signal into a communication media signal level, and transfer the communication media signal level to the second communication node 20 through the NODE_B_RX terminal 103.

The second dual FIFO memory 122 may output input data to the sixth serial driver 136. The sixth serial driver 136 may convert a TTL level signal into a communication media signal level, and transfer the communication media signal level to the first communication node 10 through the NODE_A_RX terminal 102.

Transmission data from the third communication device 30 may be input through the NODE_C_TX terminal 106, converted into a TTL level by the fifth serial driver 135, and stored in the second FIFO memory 124 and the second dual FIFO memory 122 by the second reception control unit 114.

The second dual FIFO memory 122 may preferentially transfer a packet, which is first received and stored in time by applying the FIFO scheme among packets received from a dual port, to the NODE_A_RX terminal 102.

By transferring a communication packet transfer trigger signal to the first transmission control unit 111, a packet stored in the second FIFO memory 124 may be transmitted to the NODE_B_RX terminal 105 by a priority algorithm of the first transmission control unit 111.

As described above with reference to FIGS. 3 to 5, the bidirectional packet transfer fail-over switch 100 may operate in a store and through scheme where a packet, which is received by the bidirectional packet transfer fail-over switch 100 from the first communication device 10, the second communication device 20, and the third communication device 30, is first stored in the first FIFO memory 123 and the second FIFO memory 124, and then is transmitted.

Moreover, the bidirectional packet transfer fail-over switch 100 may have a structure in which a packet is stored in the first FIFO memory 123 and the second FIFO memory 124 by the first reception control unit 112 and the second reception control unit 113, and the packet stored in the first FIFO memory 123 and the second FIFO memory 124 is transferred by the first reception control unit 112 and the second reception control unit 113 according to priority.

According to such a scheme, data is transmitted to different nodes of the second communication device 20 or the third communication device 30 without collision of signals which are simultaneously received from the first communication device 10, the second communication device 20 or the third communication device 30, and a bidirectional communication packet switching function is provided in which packets, which are simultaneously generated from two the communication devices 20 and 30, are transmitted to the first communication device 10.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A bidirectional packet transfer fail-over switch for serial communication comprising:
   a memory configured to divide packet data, which is transmitted or received for bidirectional communication between a plurality of communication devices in units of certain data, and to store the divided data; and
   a control unit configured to:
   receive a trigger signal from the memory, indicating whether the packet data is received,
   determine a priority according to an order where the packet data is received, and
   transmit the packet data to another communication device,
   wherein,
   the memory comprises:
   a first dual FIFO memory configured to store packet data received from a first communication device,
   a first FIFO memory configured to store packet data received from a second communication device, and
   a second FIFO memory configured to store packet data received from a third communication device, and
   the control unit comprises:
   a first transmission control unit configured to read data from the first dual FIFO memory and the second FIFO memory to output the data to the second communication device according to priority, and
   a second transmission control unit configured to read data from the first dual FIFO memory and the first FIFO memory to output the data to the third communication device according to priority,
   wherein the first dual FIFO memory transfers a packet data presence signal as a trigger signal to the first transmission control unit and the second transmission control unit.

2. The bidirectional packet transfer fail-over switch of claim 1, wherein,
   the memory further comprises a second dual FIFO memory configured to store packet data which is to be output to the first communication device, and
   the control unit further comprises:
   a first reception control unit configured to store packet data, received from the second communication device, in the first FIFO memory and the second dual FIFO memory, and
   a second reception control unit configured to store packet data, received from the third communication device, in the second FIFO memory and the second dual FIFO memory.

3. The bidirectional packet transfer fail-over switch of claim 1, wherein in transmitting a packet, when the first transmission control unit and the second transmission control unit receive a packet presence trigger signal from the first FIFO memory and the second FIFO memory, after a communication packet of the first dual FIFO memory is transmitted, the first transmission control unit and the second transmission control unit transmit a communication packet of each of the first FIFO memory and the second FIFO memory to the second communication device or the third communication device.

4. The bidirectional packet transfer fail-over switch of claim 1, wherein a packet size and a character size of a single packet, required by the first dual FIFO memory, the second dual FIFO memory, the first FIFO memory, and the second FIFO memory, are variably adjusted.

5. The bidirectional packet transfer fail-over switch of claim 1, wherein the first transmission control unit and the second transmission control unit comprise a built-in priority determination algorithm which is designed to preferentially transfer a packet which is first received from each of the first FIFO memory and the second FIFO memory in time.

6. The bidirectional packet transfer fail-over switch of claim 1, further comprising:
   a first serial driver configured to convert a communication media signal level into a Transistor-Transistor Logic (TTL) level signal, for packet data received from a plurality of the communication devices; and a second serial driver configured to convert a TTL level signal into a communication media signal level, for packet data which is to be transmitted to the plurality of communication devices.

7. The bidirectional packet transfer fail-over switch of claim 1, further comprising a plurality of input/output terminals for a full-duplex communication transmission/reception structure in which TX or RX is separately provided to a plurality of the communication devices.

8. The bidirectional packet transfer fail-over switch of claim 1, wherein the control unit is implemented with a programmable logic controller IC, and is designed so that real-time transfer of a communication packet and an idle time between packets are automatically varied at a communication baud rate.

* * * * *